United States Patent [19]

Garabello

[11] 3,739,519

[45] June 19, 1973

[54] PRESSURE OPERATED RETRACTABLE LANDING GEAR

[75] Inventor: Romano Garabello, Brooklyn, N.Y.

[73] Assignee: Rom-Air International, Inc., Brooklyn, N.Y.

[22] Filed: Dec. 2, 1971

[21] Appl. No.: 203,971

[52] U.S. Cl. ............................. 46/78, 244/102 R
[51] Int. Cl. ............................................. A63h 27/02
[58] Field of Search ................ 46/74 R, 75, 76 R, 46/77, 78, 76; 244/102 R, 100 R

[56] References Cited
UNITED STATES PATENTS

| | | | |
|---|---|---|---|
| 2,351,215 | 6/1944 | Kleinhans et al. | 244/102 |
| 2,896,369 | 7/1959 | Palensky | 46/76 R |
| 3,111,292 | 11/1963 | Matin | 244/102 R |

*Primary Examiner*—Milton Buchler
*Assistant Examiner*—Paul E. Sauberer
*Attorney*—Nelson Littell, Nelson Littell, Jr., Walter G. Weissenberger et al.

[57] ABSTRACT

The present invention provides a retractable landing gear system for model aircraft comprising a double-acting, fluid-pressure-operated piston and cylinder means, said piston being connected to a link which link is pivotally connected to a pivoted landing gear, the ends of the said connecting link being guided in straight-line movement by a pair of opposed parallel slots, a reservoir for the fluid under pressure, means for supplying the pressurized fluid to the piston and cylinder means controlled by servo-operated valve means to extend and retract the landing gear.

6 Claims, 9 Drawing Figures

PATENTED JUN 19 1973
3,739,519
SHEET 1 OF 2
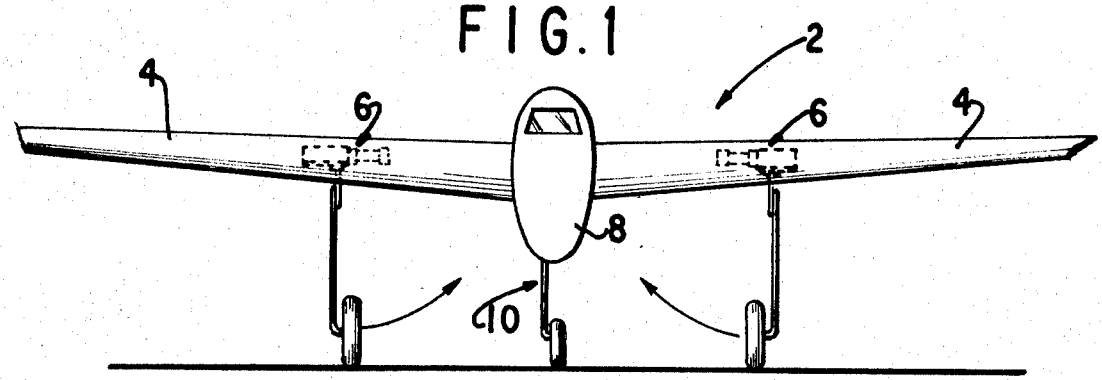
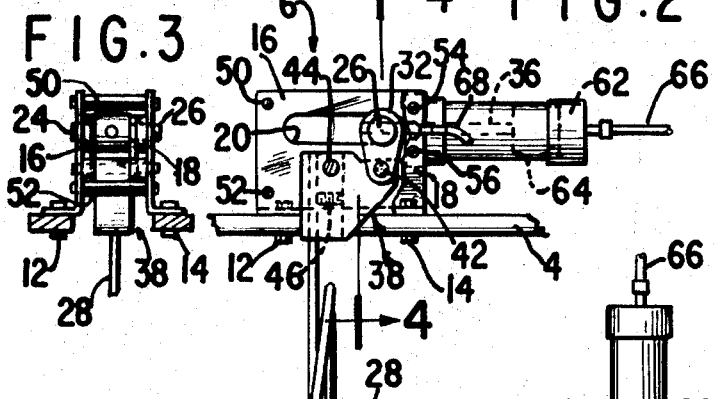
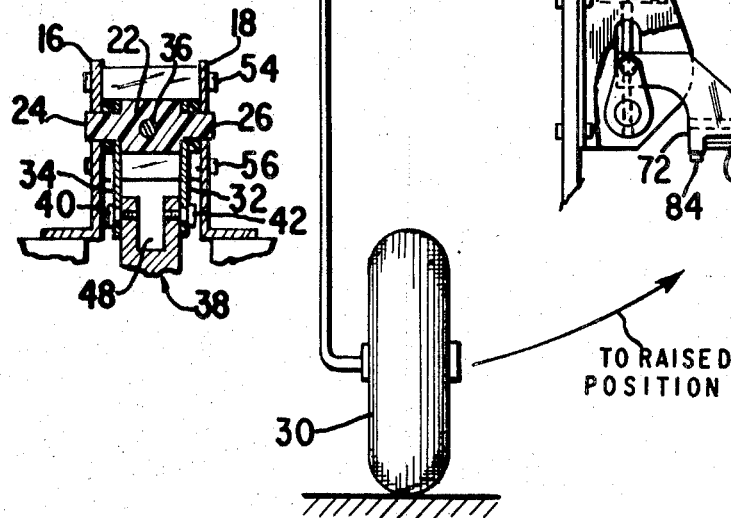
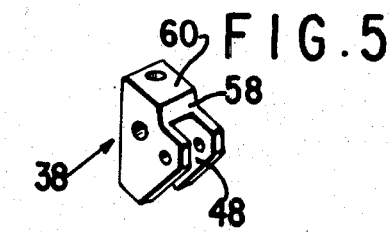
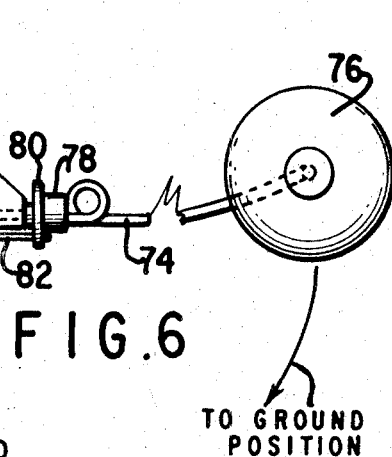
INVENTOR
ROMANO GARABELLO
BY
Hammond and Littell
ATTORNEYS

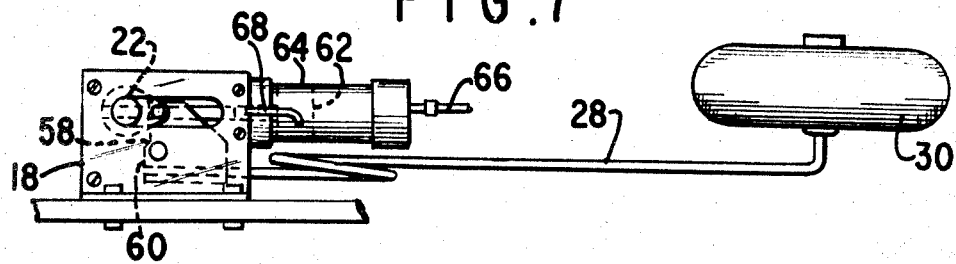
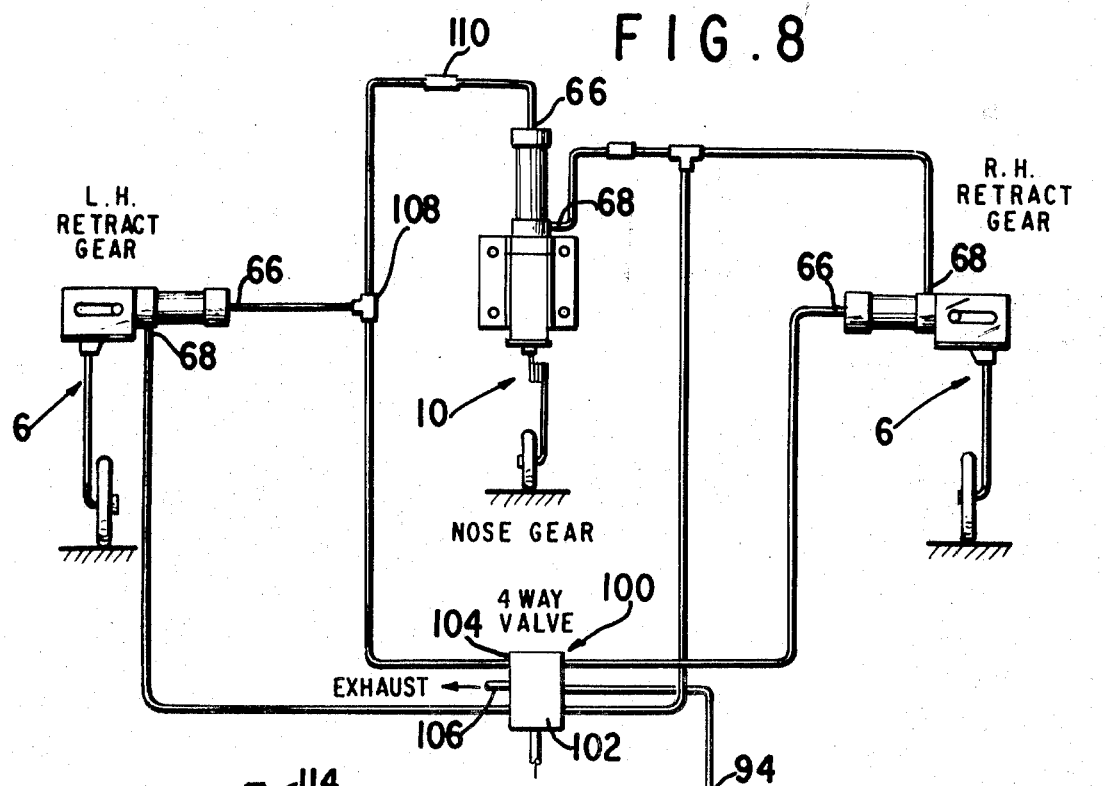
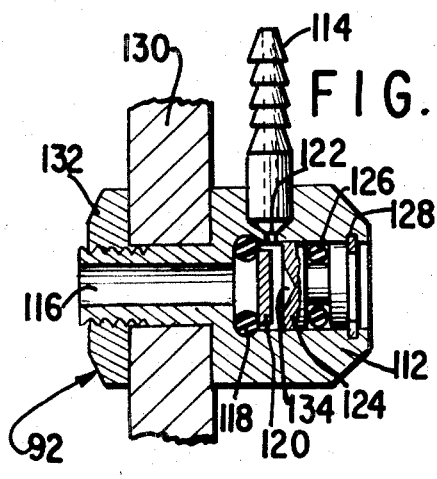

PRESSURE OPERATED RETRACTABLE LANDING GEAR

THE PRIOR ART

Model aircraft having retractable landing gear are disclosed in U. S. Pat. No. 3,431,672 issued Mar. 11, 1969 to Andrae et al. The operation of the Andrae et al. system is based upon a miniature electric motor for driving a spur gear which in turn drives a larger gear that is connected to an actuating screw means. The advancement of the actuating screw means towards the aircraft propeller causes a linkage system to raise the landing strut and wheel; and the advancement of the actuating screw means away from the propeller causes lowering of the landing strut and wheel. It has been found that electric motor operated systems have the disadvantages (1) of requiring a separate electrical motor for each wing and nose landing gear unit, (2) of causing excessive vibrations throughout the model aircraft, (3) of causing radio interference whenever the electrically operated gears are in operation, (4) of requiring a relatively long lead time in emergency cases to lower the landing gear in preparation for landing, and (5) of having the gear system locked during flight due to failure of the batteries powering the electric motor.

In U. S. Pat. No. 3,355,838, issued Dec. 5, 1967, to Huffman, it is known to utilize fluid pressure to control model aircraft by means of a balance spring loaded, gas activated piston connected through wire push rod linkage to the aircraft engine, to the horizontally disposed elevator, and to the vertically disposed rudder. It has been found that balance spring loaded piston systems have the disadvantages (1) of one or both of the balance springs weakening or failing so that the piston will not return to its neutral position and (2) of having disconnected wire push rods preventing the piston from operating its respective control element.

OBJECTS OF THE INVENTION

It is therefore an object of the present invention to provide a model aircraft retractable landing gear system, as well as a retractable landing gear structure that overcomes all of the above stated difficulties.

It is another object of the present invention to provide a model aircraft retractable landing gear system that insures dependable retraction and extension of the landing gear structure without the need for balancing springs, and that allows the landing gear structure to be stalled in any intermediate or final position without jamming or failing.

It is an object of the present invention to provide a model aircraft retractable landing gear system in which the gas pressure keeps the retracted gears snugly housed in their wells during the entire flight and free from bearing wear due to engine vibration; in which there is no radio interference, common with electrically operated gears in the retracted position; in which there is no more "nightmare" adjustment of wire push rods to an exact down and locked position; in which there is no need for a second servo switch to activate the nose gear; in which the landing gear system is not impaired by added weight; and in which the retractable landing gears may even be extended when in an inverted position.

It is a further object of the present invention to provide a retractable landing gear system for model aircraft comprising a double-acting, fluid-pressure-operated piston and cylinder means, said piston being connected to a link which link is pivotally connected to a pivoted landing gear, the ends of said connecting link being guided in straight-line movement by a pair of opposed parallel slots, a reservoir for the fluid under pressure, means for supplying the pressurized fluid to the piston and cylinder means controlled by servo-operated valve means to extend and retract the landing gear.

It is another object of the present invention to provide a filling valve assembly for a pressure operated retractable landing gear system comprising a body provided with a filling port; a first "O" ring adjacent the filling port; a poppet valve in the bore of the valve assembly; means for sealing the bore of the valve assembly; and a fluid exit port opening into the bore and positioned between said first "O" ring and said sealing means.

These and other objects of the present invention will become more apparent from the description and from the drawings which are not deemed limitative of the invention.

FIG. 1 shows a model aircraft carrying the retractable landing gear of the invention;

FIG. 2 shows a partial sectional view of the wing retractable landing gear structure in its extended position;

FIG. 3 is an end view of the retractable landing gear structure shown in FIG. 2;

FIG. 4 is a section view of the retractable landing gear structure taken along line 4 — 4 of FIG. 2;

FIG. 5 is a perspective view of the block member feature of the present invention;

FIG. 6 shows the nose fuselage retractable landing gear structure in its retracted position against the nose of the aircraft;

FIG. 7 shows the wing landing gear in its retracted position against the wing of the aircraft;

FIG. 8 is a schematic drawing of the retractable landing gear system of the present invention;

FIG. 9 is a cross-sectional view of the filling valve assembly for the retractable pressure operated landing gear.

DESCRIPTION OF THE INVENTION

The present invention is directed to a retractable landing gear system for model aircraft comprising a double-acting, fluid-pressure-operated piston and cylinder means, said piston being connected to a link which link is pivotally connected to pivoted landing gear, the ends of the said connecting link being guided in straight-line movement by a pair of opposed parallel slots, a reservoir for the fluid under pressure, means for supplying the pressurized fluid to the piston and cylinder means controlled by servo-operated valve means to extend and retract the landing gear.

The present invention is also directed to a filling valve assembly for a pressure operated retractable landing gear system comprising a body provided with a filling port; a first "O" ring adjacent the filling port; a poppet valve in the bore of the valve assembly; means for sealing the bore of the valve assembly; and a fluid exit port opening into the bore and positioned between said first "O" ring and said sealing means.

Referring specifically to the drawings, FIG. 1 shows a model aircraft 2 having wings 4 provided with wing retractable landing gear 6 and having fuselage 8 supported by nose fuselage retractable landing gear 10 positioned in the nose portion thereof.

FIGS. 2, 3, 4, and 5 show a more detailed drawing of the wing landing gear 6 in its extended position contacting the ground. The wing landing gear 6 is mounted onto the wing 4 by means of bolts 12 and 14 which are positioned to fit into holes in metal brackets 16 and 18. Each bracket comprises a right angular member having therein a horizontal slot 20, in which a plastic link 22, for example made of self-lubricating nylon, is slidably held for reciprocating movement, as will be later explained. The link is cylindrically shaped and has at each end thereof, a shoulder portion 24 or 26 being of a lesser diameter than that of the central portion of the link. FIG. 2 shows how shoulder 26 is slidably held by slot 20 of bracket 18 for reciprocating movement thereof.

Wheel supporting strut 28 carries wheel 30 and is connected to block member 38, which is connected in turn to the reciprocating link 22 by means of two collar means 32 and 34 each of which has the larger end thereof snugly fitted around the link. Each collar is positioned between connecting rod 36 and a corresponding adjacent shoulder of the link. Fastener pins 40 and 42 connect the block member to the smaller end of each collar means. A pivot pin 44 connects the block member 38 to the pair of brackets 16 and 18. Screw means 46 holds strut 28 tightly within block member 38 and can be reached through slotted portion 48. Brackets 16 and 18 are rigidly maintained in a spaced relationship by spacer pins 50, 52, 54, and 56. Block member 38 further possesses a scooped out bevel portion 58 between the upper ridge portion 60 and the slotted portion 48. Bevel portion 58 provides a recess parallel to the link 22, above which the link is stationed as it reciprocates within the slots of the brackets.

A gas activated piston chamber 62 (FIG. 2) contains a reciprocating piston 64 and has gas inlet means and gas outlet means 66 and 68, depending on the direction of the gas flow. A rod 36 is connected at one end to the reciprocating piston and attached at the other end to the link 22 enabling it to reciprocate within slots 20.

FIG. 6 shows the fuselage landing gear in its retracted position adjacent to the body of the fuselage, while FIG. 7 shows the wing landing gear in its retracted position adjacent to the wing structure.

A comparison of FIG. 2 with FIG. 6 indicates that the wing gear and the nose gear are different in regard to certain aspects and features. Block member 70 in FIG. 6 has a scooped out bevel portion 72 comprising an arcuate surface having a greater radius of curvature than the radius of curvature of arcuate surface 58 in FIG. 5. This greater curvature is required to accommodate the greater distance through which the link must travel. Strut 74 carrying nose wheel 76 is not only attached to block member 70 but also to platform 78 which has an upper portion 80. Since the nose gear 10 is also utilized to steer the aircraft, a flexible wire 82 is provided between portion 80 and retaining torque pin 84. Whenever wheel 76 is turned toward or away from the viewer, a turning torque is applied to wire 82, which provides a countertorque tending to return the wheel to the sideview position shown in FIG. 6. Only two spacer pins 86 and 88 are necessary to rigidly maintain the brackets in their spaced relationship in the nose gear.

A comparison of FIG. 2 with FIG. 7 shows that the landing gear is locked in the down position for contacting the ground whenever the link 22 is positioned at its closest proximity to the fluid activated piston chamber 62. In other words, the structure connecting link 22 to the landing gear strut 28 is locked in the down position whenever the connecting rod 36 is perpendicular to a line (not shown) connecting the center of link shoulder 26 and fastener means 42. Conversely the landing gear is held in the up position adjacent to and usually touching the aircraft whenever the link 22 is positioned at its farthest distance from the fluid activated piston chamber 62.

The landing gear 10 mounted on the nose of the fuselage is further characterized in that whenever the connecting rod is parallel to the strut carrying a wheel, the strut is extended away from the model aircraft fuselage; and whenever the connecting rod is at right angles to the strut carrying a wheel, the strut is retracted toward the model aircraft fuselage.

The landing gear 6 mounted on the wing of the model aircraft is further characterized in that whenever the connecting rod is perpendicular to the strut carrying a wheel, the strut is extended away from the model aircraft wing; and whenever the connecting rod is parallel to the strut carrying a wheel, the strut is retracted toward the model aircraft wing.

FIG. 8 schematically shows the retractable landing gear system as a whole. Gas pressure to operate the landing gear is provided by a pressurized gas source cylinder 90 carried onboard the model aircraft.

Apparatus to refill the pressurized gas source cylinder 90 includes refilling tank (not shown) which plugs into filling valve assembly 92 for recharging the onboard gas source up to its maximum recommended pressure. The connection between onboard gas source 90 and filling valve 92 can be made by detachable flexible tubing 96 made of plastic. The fluid usually employed is a noncombustible nontoxic gas like freon, capable of safe use in the presence of children or adults operating the model aircraft. When the fluid is a gas, the onboard source 90 has a gas connector tube 94 inserted therein as a liquid trap which keeps any unwanted condensate or liquid from entering the system and from fouling the gas valve 100.

In the operation of the retractable landing gear system, a radio signal transmitter (not shown) emits a signal for raising or for lowering the gear, which is then received by the servo mechanism 98. Servo 98 then activates or shifts the feather-touch four-way valve 100. This four-way valve then moves through only a ¼ inch stroke and provides an air pressure of 15 to 20 psi. of thrust which is applied to each of the landing gears, both nose gear as well as wing gear. Thus activation of the four-way valve can result in either raising or lowering the landing gear in unison, depending upon the command signal sent to the servo mechanism.

In building the fluid pressure activated system of this invention, either gas or liquid may be utilized; however gas is usually utilized. In constructing the system shown in FIG. 8, flexible tubing 96 connects inlet outlet means 68 of the nose and wing landing gears to the same side 102 of the four-way valve to raise or to lower the landing gear in unison. Tubing 96 also connects inlet outlet means 66 of the nose and wing landing gear to side 104 of valve 100 so as to raise or to lower the landing gear in unison. Each means 66 and 68 serves alternately as an inlet means and as an outlet means. When the pressurized gas from valve 100 enters the chamber 62 through means 66 moving piston 64 of FIG. 7 to the left, then gas in the chamber 62 on the low pressure side of the moving piston is expelled through means 68. The landing gear is then raised as shown in FIGS. 6 and 7. When the pressurized gas from valve 100 enters the chamber 62 in the opposite direction through means 68 moving the piston 64 of FIG. 2 to the right, then gas in the chamber on the low pressure side of the moving piston is expelled through means 66. The landing gear is then lowered as shown in FIG. 2. Exhaust means 106 handles the escape of the effluent gas from the low pressure side of the piston 64, whether the landing gear is being raised or lowered. T-fittings 108 and slip on fittings 110 are utilized to provide changes in the direction and in the length of tubing 96.

Each time that connecting rod 36 fully extends from or fully retracts into the chamber 62, it passes into and passes out of, respectively, slotted portion 48 of block member 38 in FIG. 2 or block member 70 in FIG. 6. When the connecting rod 36 is fully extended out of piston chamber 62, the rod is housed in the recess 48 of the slotted portion between and parallel to the two collars 32 and 34. Simultaneously link 22 reciprocates within slots 20 passing above arcuate surface portion 58 of block 38 or above arcuate surface portion 72 of block 70.

FIG. 9 shows a cross-section of filling valve assembly 92 comprising a body 112 of aluminum. Flexible tubing 96 from onboard gas source 90 is attached to port 114. A filling port 116 provides an opening through which a filling nozzle (not shown) is inserted and held in place by interference fit only. An "O" ring 118 is held in place by means of a recess in the bore of the valve. A poppet valve 120 is shown in FIG. 9 held in the closed position by pressure returning from port 114 and through opening 122. When the pressure at opening 122 is greater than the pressure at filling port 116, the poppet valve will be pressed against "O" ring 118 closing off the filling valve assembly. The positioning of opening 122 and the differential diameter between the bore in body 112 and poppet valve 120 is the controlling factor in the closing of the valve without the need for a return spring when the filling or gauge nozzle is removed.

With the filling nozzle inserted into filling port 116, the higher pressure to the left of "O" ring 118 drives the poppet valve to the right where its movement is stopped by contacting gland 124. The gland has a notched out portion 134 that prevents sticking of the poppet valve to the gland. A second "O" ring 126 provides a seal that is held in position by snap ring 128, which is retained in a slotted portion at the end of the bore. The valve is mounted on panel 130 by threaded nut 132. The combined effect of "O" rings 118 and 126 and gland 124 is to dampen out vibrations of the poppet valve by absorbing the impact energy of the poppet valve.

A novel and unexpected result of the present invention is that the retractable landing gear can be locked into the extended down position for landing of the aircraft. In the previously known systems of wire push rods, these rods would frequently become stretched and loosened due to repeated use during takeoffs and landings. Consequently, it could happen that the landing gear would not be locked into position during landing of the aircraft. The impact of this landing would then cause the model aircraft to tip over and damage a wing or other fragile sections thereof, leading to expensive repairs or rebuilding. With the present system this problem is overcome because the landing gear locks into position every time. Moreover, if there is engine failure on takeoff during retraction of the landing gear, the landing gear can be rapidly reversed without the reversal of the gear drive means of the prior art which operate slowly.

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

I claim:

1. A retractable landing gear system for model aircraft comprising a double-acting, fluid-pressure-operated piston and cylinder means, said piston being connected to a link pivotally connected to a pivoted landing gear, the ends of the said connecting link disposed in a pair of opposed parallel slots to guide the link therein in a straight-line, a reservoir for the fluid under pressure, means for supplying the pressurized fluid to the piston and cylinder means controlled by servo-operated valve means to extend and retract the landing gear.

2. The retractable landing gear system of claim 1 wherein each of said opposed parallel slots is horizontal and is contained by one of a pair of brackets shaped in a right angle; and wherein the link has two shoulders, each one of which is slidably held by the slot in the bracket adjacent to that shoulder.

3. The retractable landing gear system of claim 1, wherein said fluid activated piston chamber has fluid inlet means and fluid outlet means; and a rod connected at one end to the reciprocating piston and attached at the other end to the connecting link.

4. The retractable landing gear system of claim 3, wherein means for connecting the link to the landing gear comprises two collar means, each having one end thereof snugly fitted around said link, with each collar means positioned between the connecting rod and a corresponding adjacent shoulder of the link; a block member carrying a wheel supporting strut; a pivot pin connecting said block member to said pair of brackets; and means for fastening the other end of each collar to said block member.

5. The retractable landing gear system of claim 4, wherein said block member has a slotted portion between and parallel to said two collars for providing a recess into which the connecting rod is housed, when the connecting rod is extended out of the piston chamber so as to raise up the wheel supporting strut.

6. The retractable landing gear system of claim 5, wherein said block member has a scooped out bevel portion providing a recess parallel to the link above which the link is stationed as it reciprocates within the slots of the brackets.

* * * * *